UNITED STATES PATENT OFFICE.

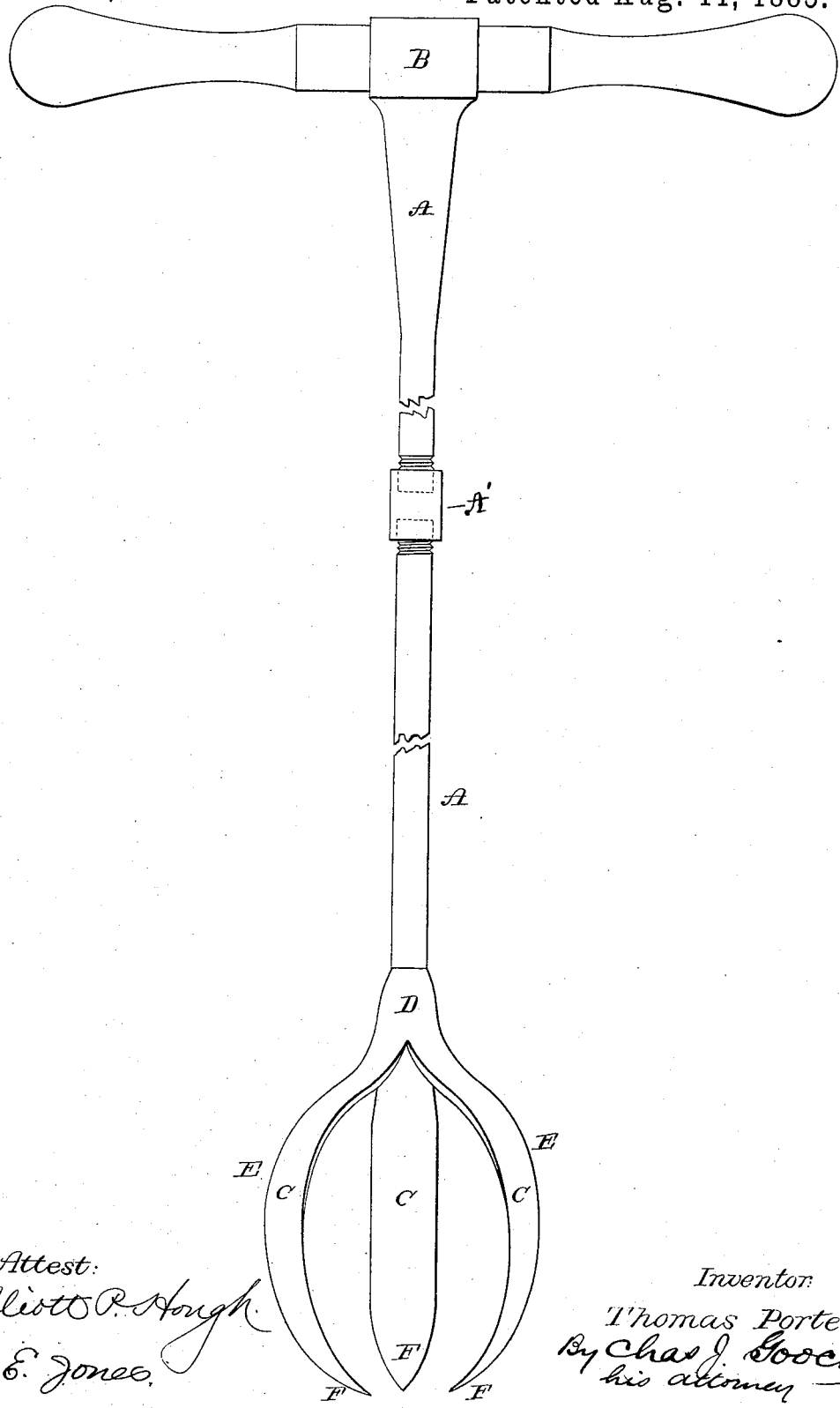

THOMAS PORTER, OF ABILENE, TEXAS.

EARTH-AUGER.

SPECIFICATION forming part of Letters Patent No. 324,162, dated August 11, 1885.

Application filed April 27, 1885. (No model.)

*To all whom it may concern:*

Be it known that I, THOMAS PORTER, a citizen of the United States of America, residing at Abilene, in the county of Taylor and State of Texas, have invented certain new and useful Improvements in Earth-Augers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention consists in certain improvements in earth-augers, as will be hereinafter described and claimed.

The drawing represents a side elevation of an auger constructed according to my invention.

A represents the shaft which is formed in two parts or sections, the upper end of the lower section and the lower end of the upper section each having a screw-thread formed thereon, and the two parts being coupled together by an interiorly screw-threaded thimble or nut, A'. The upper section at its upper end is provided with an eye, B, within which is inserted a sweep or handle, by means of which the auger may be turned when boring the earth.

C represents the blades or cutters, which may be of any approved form and shape, although it is preferred that they be of the form shown in the drawing—that is to say, with a straight or nearly straight shank, D, at their upper end, and with outwardly curved or bowed side E, and inwardly-curved point F. These blades or cutters C are securely and rigidly attached to the lower end of the lower part of the shaft A by welding the shanks D thereon, instead of connecting them to the shaft by means of bolts or by bolting them to curved arms connected to the shaft by means of a socket or collar. Wnere the blades or cutters C are welded directly to the shaft A certain advantages are secured over those augers where curved arms are first attached to the shaft and the cutters then connected to such arms, or where the cutters are bolted to the shaft. For instance, the auger herein described can be readily constructed and the cutters renewed whenever necessary by any blacksmith, even those in remote country towns and villages. The necessity of having them constructed in quantities or in manufactories, as is the case with most other forms, is avoided. There are fewer parts necessary, thus reducing the cost of the auger and reducing the liability of the auger getting out of repair or of parts becoming loose and lost or misplaced. Where bolts and nuts are employed for securing the cutters to the shaft or to arms connected thereto, such bolts and nuts are apt to become loose in use, and thus loosen the blades or cutters and render them unfit for service. Furthermore, such bolts and nuts are liable to become broken, and, when loosened, lost, and it often happens that an ordinary blacksmith is then unable to replace them, thus necessitating either the obtaining of a new auger or the sending of the old one to the factory to be renewed in parts—inconveniences that are very objectionable, and all of which are avoided by my improved construction, wherein there are no parts to become loose—and whenever it is necessary to renew either or all of the cutters or to entirely construct an auger, such can be readily done by any blacksmith with his ordinary tools.

I am aware that scrapers for cleaning out sewers have been formed with a two-part rod connected together by a hook-and-eye joint, and with the scraper welded to one of the rods, and also that earth-augers have been constructed with the claws and shanks formed in one piece, the shanks being provided with bolt-holes fur the purpose of securing the bolting of said shanks to the rods, and such I do not claim.

By forming the shaft A in two parts with screw-threaded connecting ends, and coupling them together by a screw-nut or thimble, A', whenever it is desired to transport a number of augers from place to place the two parts of the shaft can be separated and packed in bulk in small compass, and when separated the lower section can be more readily handled by a blacksmith when welding cutters thereon than could be done were the shaft made in a single piece; also, should a portion of the shaft become broken or injured it can be readily replaced, thus avoiding the total destruction of the auger which would result were the shaft formed in a single piece.

By forming the connecting ends of the shaft with screw-threads and coupling them together by means of a nut, as A', a more secure and rigid coupling is secured than would be possible were the rod provided with a hook-and-eye joint.

Having thus described my invention, what I claim is—

An earth-auger composed of a two-part shaft having screw-threaded connecting ends and an interiorly screw-threaded thimble or nut for removably connecting said sections together, and at its upper end an eye to receive a sweep or handle, and blades or cutters welded to the lower ends of said shaft, substantially as set forth.

In testimony whereof I affix my signature in presence of two witnesses.

THOMAS PORTER.

Witnesses:
OTTO N. STEFFENS,
GEO. W. JALVINCK.